United States Patent [19]

Igarashi et al.

[11] Patent Number: 4,492,112
[45] Date of Patent: Jan. 8, 1985

[54] OPTIMUM SHIFT POSITION INDICATING DEVICE OF VEHICLE

[75] Inventors: Kouhei Igarashi, Susono; Kazuo Tomita, Gotenba, both of Japan

[73] Assignee: Toyota Jidosha Kabushiki Kaisha, Toyota, Japan

[21] Appl. No.: 403,814

[22] Filed: Jul. 30, 1982

[30] Foreign Application Priority Data

Apr. 13, 1982 [JP] Japan .................. 57-61247

[51] Int. Cl.³ .......................................... G01M 15/00
[52] U.S. Cl. ................................... 73/117.3; 73/114
[58] Field of Search ........................ 73/114, 117.3; 340/52 R, 59; 364/442

[56] References Cited

U.S. PATENT DOCUMENTS 4,025,897  5/1977  Kisuna et al. ............. 340/52 R
4,355,296  10/1982  Drone ....................... 340/52 R

*Primary Examiner*—Jerry W. Myracle
*Attorney, Agent, or Firm*—Cushman, Darby & Cushman

[57] ABSTRACT

The optimum shift position indicating device of a vehicle comprising: a vehicle speed sensor for detecting a running speed of the vehicle; an engine rotation sensor for detecting a rotational speed of an engine; an engine load sensor for detecting an engine load; an operational circuit in which a driving power at present is calculated from an engine torque obtainable from the engine rotational speed and the engine load, subsequently, required engine torques at respective shift positions are calculated from the driving power, further, fuel consumption rates at the respective shift positions are obtained from the engine rotational speeds and the required engine torques at the respective shift positions, and information on the optimum shift position where the best fuel consumption rate is obtainable is outputted; and shift position indicating elements for indicating an output from said operational circuit; and capable of giving a driver the information on the optimum shift position where the best fuel consumption rate is obtainable during running condition at present.

11 Claims, 5 Drawing Figures

OPTIMUM SHIFT POSITION INDICATING DEVICE OF VEHICLE

BACKGROUND OF THE INVENTION

1. Field of the Invention

This invention relates to an optimum shift position indicating device of a vehicle, and more particularly to the optimum shift position indicating device suitable for use in a motor vehicle provided thereon with a manual transmission and an electronic controlled fuel injection type engine.

2. Description of the Prior Art

Recently, with the possible dry-up of petroleum resources in the near future being forecasted, the reduction of fuel consumption of the vehicles such as motor vehicles has become one of the social demands. In general, the fuel consumption of the motor vehicle varies to a considerable extent depending on not only the fuel consumption performance of an engine but also the driving manner of a driver, and hence, necessity has been voiced for a device for instructing the optimum driving manner suitable for the running condition at present to an ordinary driver not having a satisfactory knowledge about the motor vehicle. With this end in view, heretofore, there has been put to use a so-called economy meter for indicating an intake vacuum of the engine by a pointer, a so-called drive computer for calculating and indicating a fuel consumption per unit running distance (Km/l) or the like. However, the above-described methods present such disadvantages that the effect of fuel consumption should not necessarily be satisfactory because only information of the accelerator operation can be transmitted to the driver in either case.

SUMMARY OF THE INVENTION

The present invention has been developed to obviate the above-described disadvantage of the prior art and has as its first object the provision of an optimum shift position indicating device of a vehicle, capable of giving a driver information of the optimum shift position where the best fuel consumption rate is obtainable for the running condition at present, and consequently, capable of effectively reducing the fuel consumption.

In addition to its first object, the present invention has as its second object the provision of an optimum shift position indicating device of a vehicle, which can dispense with an engine load sensor separately provided, when applied to a motor vehicle provided thereon with an L-J type electronic controlled fuel injection type engine.

In addition to its first object, the present invention has as its third object the provision of an optimum shift position indicating device of a vehicle, by which driver can easily and quickly learn the optimum shift position.

In addition to the first and the third objects, the present invention has as its fourth object the provision of an optimum shift position indicating device of a vehicle, capable of giving a driver highly reliable information without indicating an abnormal value, an unnecessary value or the like.

In addition to the first object, the present invention has as its fifth object the provision of the optimum shift position indicating device of a vehicle, wherein shift position indicating means is inexpensively provided.

To achieve the aforesaid first object, the present invention contemplates that the optimum shift position indicating device of a vehicle comprises: a vehicle speed sensor for detecting a running speed of the vehicle; an engine rotation sensor for detecting a rotational speed of an engine; an engine load sensor for detecting an engine load; an operational circuit in which a driving power at present is calculated from an engine torque obtainable from the engine rotational speed and the engine load, subsequently, required engine torques at respective shift positions are calculated from the driving power, further, fuel consumption rates at the respective shift positions are obtained from the engine rotational speeds and the required engine torques at the respective shift positions, and information on the optimum shift position where the best fuel consumption rate is obtainable is output; and shift position indicating means for indicating an output from the operational circuit.

To achieve the aforesaid second object, the present invention contemplates that the engine load sensor is substituted by an air flow meter for detecting an intake air flowrate and the aforesaid engine rotation sensor for detecting the engine rotational speed, whereby an engine load is obtained from a ratio Q/N between the air flowrate Q and the engine rotational speed N.

To achieve the aforesaid third object, the present invention contemplates that the shift position indicating means is a digital indicator for directly indicating the optimum shift position where the best fuel consumption rate is obtainable.

To achieve the aforesaid fourth object, the present invention contemplates that the digital indicator is adapted to indicate zero when a throttle valve is closed, a clutch is in operation or the vehicle is stopped.

To achieve the aforesaid fifth object, the present invention contemplates that the shift position indicating means is adapted to indicate a shifting direction to the optimum shift position where the best fuel consumption rate is obtainable.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of an embodiment of a motor vehicle provided thereon with a manual transmission and an electronic controlled fuel injection type engine, to which is applied the optimum shift position indicating device of a vehicle according to the present invention, with reference to the drawings.

Figure 1:
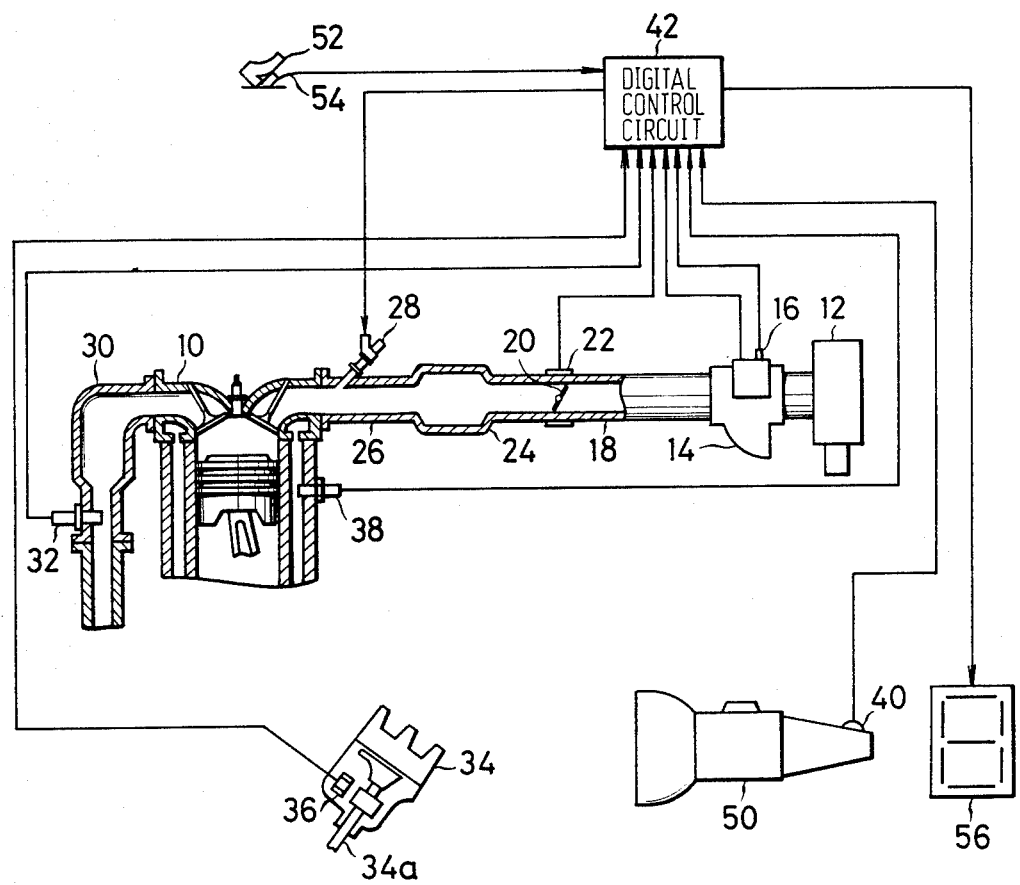
FIG. 1 is a block diagram showing the arrangement of the essential portions of an embodiment of a motor vehicle provided thereon with a manual transmission and an electronic controlled fuel injection type engine, to which is applied the optimum shift position indicating device of a vehicle acccording to the present invention.

The present embodiment is of such an arrangement that, in a motor vehicle as shown in FIG. 1, comprising:

an electronic controlled fuel injection type engine 10 including: an air cleaner 12 for taking in external air; an air flow meter 14 for detecting a flowrate of intake air taken in through the air cleaner 12; an intake air temperature sensor 16 for detecting the temperature of intake air, incorporated in the air flow meter 14; a throttle valve 20 provided in an intake pipe 18 and rotatable in operational association with an accelerator pedal, not shown, disposed at a driver's seat, for controlling the flowrate of intake air; a throttle sensor 22 including an idle switch to be turned "ON" when the throttle valve 20 is fully closed, for detecting the opening of the throttle valve 20; a surge tank 24; an injector 28 provided on an intake manifold 26, for blowing out fuel into an intake port of the engine 10; an oxygen concentration sensor 32 provided on an exhaust manifold 30, for sensing an air-fuel ratio from the residual oxygen concentration in the exhaust gas; a distributor 34 having a distributor shaft 34a rotatable in operational association with the rotation of a crankshaft of the engine 10; a crank angle sensor 36 incorporated in the distributor 34, for outputting a crank angle signal as being an engine rotation signal in accordance with the rotation of the aforesaid distributor shaft 34a; a coolant temperature sensor 38 provided on an engine block, for sensing the temperature of an engine coolant; a vehicle speed sensor 40 for detecting a running speed of the vehicle from a rotational speed of an output shaft of a manual transmission 50; and a digital control circuit 42 in which a basic injection time per cycle of the engine is calculated in accordance with the intake air flowrate fed from the aforesaid air flow meter 14 and the engine rotational speed obtained from the crank angle signal fed from the aforesaid crank angle sensor 36, a result thus calculated is subjected to an increase or decrease correction in accordance with a throttle valve opening fed from the aforesaid throttle sensor 22, an air-fuel ratio fed from the aforesaid oxygen concentration sensor 32, an engine coolant temperature fed from the aforesaid coolant temperature sensor 38 and the like so as to determine a fuel injection time and feed an injector opening time signal to the aforesaid injector 28; and the manual transmission 50 for performing speed change operations in accordance with the running condition of the vehicle; there are provided a clutch switch 54 for detecting the presence or absence of a clutch operation from the depressed state of a clutch pedal 52 provided at a driver's seat and a digital indicator 56 provided at the driver's seat, for directly indicating the optimum shift position where the best fuel consumption rate is obtainable, and, in the aforesaid digital control circuit 42, a driving power at present is calculated from an engine torque obtained from an engine rotational speed and an engine load, subsequently, required engine torques at respective shift positions are calculated from the driving power, and further, fuel consumption rates at the respective shift positions are obtained from the engine rotational speeds and the required engine torques at the respective shift positions so as to output the optimum shift position, where the best fuel consumption rate is obtained, to the aforesaid digital indicator 56.

Figure 2:
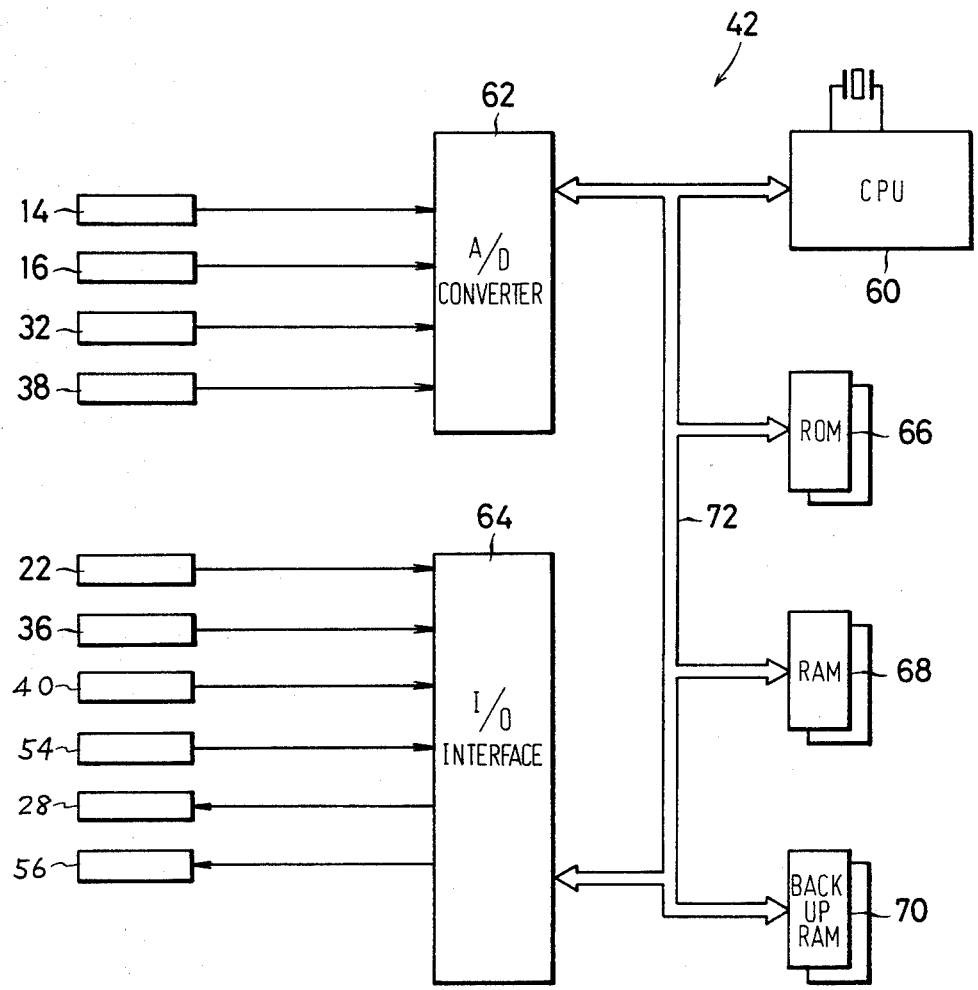
FIG. 2 is a block diagram showing the arrangement of the digital control circuit used in the aforesaid embodiment.

As shown in FIG. 2 in detail, the digital control circuit 42 comprises: a central processing unit (hereinafter referred to as "CPU") 60 consisting of a microprocessor for effecting various operations; an analogue/digital converter 62 provided with a multiplexer for converting analogue signals input from the aforesaid air flow meter 14, intake air temperature sensor 16, oxygen concentration sensor 32, coolant temperature sensor 38 and the like into digital signals and successively taking in the CPU 60 the same, an input/output interface 64 provided with a buffer, for taking in the CPU 60 at predetermined timings digital signals inputted from the aforesaid throttle sensor 32, crank angle sensor 36, vehicle speed sensor 40, clutch switch 54 and the like and outputting to the aforesaid injector 28, digital indicator 56 and the like results calculated in the CPU 60 at predetermined timings; a Read Only Memory (hereinafter referred to as "ROM") 66 for storing programs, various constants and the like; a Random Access Memory (hereinafter referred to as "RAM") 68 for temporarily storing operational data and the like in the CPU 60; a backup Random Access Memory 70 capable of being fed from an auxiliary power source to maintain the storage even if the engine is stopped; and a common bus 72 connecting the aforesaid respective components to one another.

Description will hereunder be given of action.

Firstly, the digital control circuit 42 calculates a basic injection time TP through the following equation on the basis of an intake air flowrate Q from the air flow meter 14 and an engine rotational speed N calculated from a crank angle signal from the crank angle sensor 36.

$$TP = K \times Q/N \qquad (1)$$

where K is a constant.

Further, a valid injection time TAU1 is calculated by correcting the aforesaid basic injection time TP in response to signals from the respective sensors through the following equation.

$$TAU1 = F \times Tp \qquad (2)$$

where F is a coefficient of correction for effecting various corrections.

The valid injection time TAU1 thus obtained is added thereto with an invalid injection time TAUV corresponding to a delayed response time of the injector 28 when the battery voltage drops for the injection process as shown in the following equation, thereby enabling to obtain a fuel injection time TAU.

$$TAU = TAU1 + TAUV \qquad (3)$$

A valve opening time signal corresponding to this fuel injection time TAU is fed to the injector 28, whereby the injector 28 is opened in synchronism with the rotation of the engine only for the fuel injection time TAU, so that fuel can be blown into the intake manifold 26 of the engine.

Figure 3:
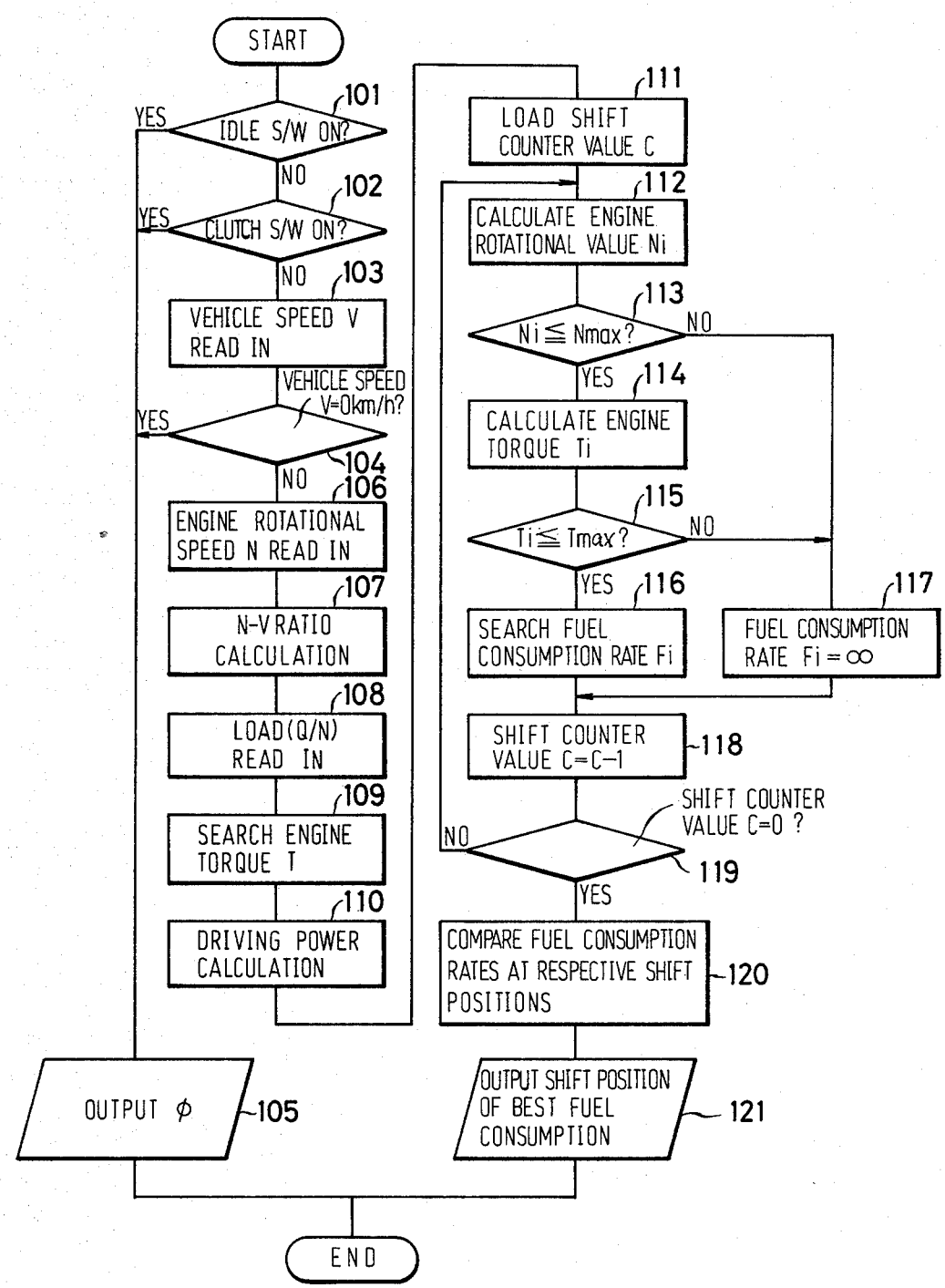
FIG. 3 is a flow chart showing a program for indicating the optimum shift position.

Indication of the optimum shift position in the present embodiment is carried out in accordance with the program shown in FIG. 3.

More specifically, firstly, in Step 101, it is judged whether the idle switch of the aforesaid throttle sensor 22 is "ON" or not. If the result of judgment is negative, i.e., the throttle valve 20 is in an opened state, then the process goes forward to Step 102, where judgment is made whether the aforesaid clutch switch 54 is "ON" or not. If the result of judgment is negative, i.e., the clutch is not in operation, then the process goes forward to Step 103, where a vehicle speed V is read in from an output of the aforesaid vehicle speed sensor 40. Subsequently, the process goes forward to Step 104, where judgment is made whether the vehicle speed V thus read in is zero or not. When the result of judgment in the aforesaid Step 101, 102 or 103 is positive, it is judged that the need of indicating the optimum shift position is eliminated, and the process goes forward to Step 105, where, for example, zero is fed to the aforesaid digital indicator 56, thus completing this program.

Figure 4:
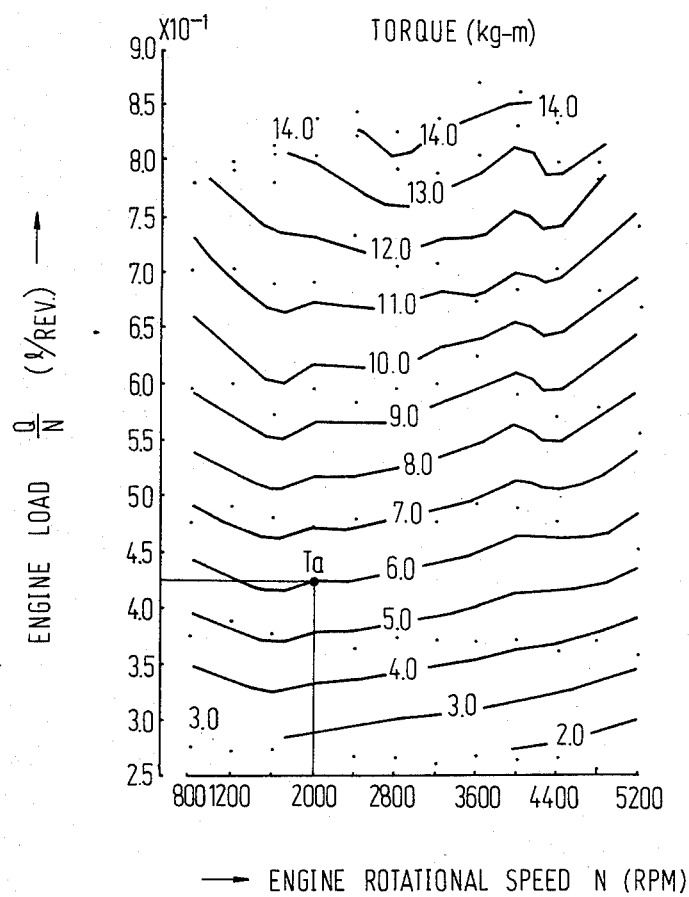
FIG. 4 is a chart showing an engine torque search map.

On the other hand, when the result of judgment in the aforesaid Step 104 is negative, i.e., the vehicle is running, the process goes forward to Step 106, where an engine rotational speed N is read in from a crank angle signal fed from the aforesaid crank angle sensor 36. Subsequently, the process goes forward to Step 107, where a ratio between the engine rotational speed N and the vehicle speed V (hereinafter referred to as "a ratio N-V") is calculated from the vehicle speed V read in in the aforesaid Step 103 and the engine rotational speed N calculated in Step 106. Next, the process goes forward to Step 108, where an engine load Q/N is calculated from a ratio between the intake air flowrate Q obtained from the aforesaid air flow meter 14 and the engine rotational speed N and read in. Subsequently, the process goes forward to Step 109, where an actual engine torque Ta at present is sought from a map of curves of secondary degree (referred to as "an engine torque search map") showing the relationship between the engine rotational speed N, the engine load Q/N and the engine torque T, which is previously stored in the aforesaid ROM 66 as shown in FIG. 4, and read out. Subsequently, the process goes forward to Step 110, where the driving power during running at present is calculated from the engine torque Ta obtained in the aforesaid Step 109 and the engine rotational speed N read in in the aforesaid Step 106, through the following equation.

Driving power = Ta × N/716.2  (4)

Figure 5:
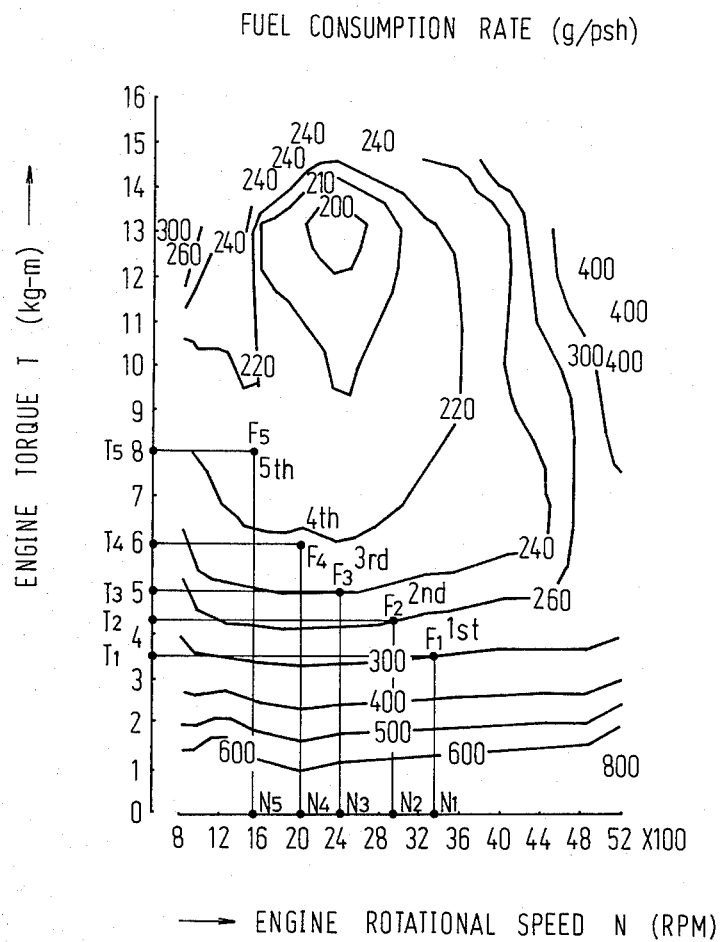
FIG. 5 is a chart showing a fuel consumption rate map.

Further, the process goes forward to Step 111, where a shift counter value C corresponding to the highest speed gear (for example, C=5) is loaded on a shift counter for counting shift positions. Subsequently, the process goes forward to Step 112, where an engine rotational speed Ni at a shift position i (i=1 to 5) corresponding to the aforesaid shift counter value is calculated from the vehicle speed V at present read in in the aforesaid Step 103 and the ratios N-V at the respective shift positions. Next, the process goes forward to Step 113, where judgment is made whether the engine rotational speed Ni calculated in Step 112 is less than the allowable maximum rotational speed Nmax or not. When the result of judgment is positive, the process goes forward to Step 114, where an engine torque Ti required at the relevant shift position is calculated from the driving power at present calculated in the aforesaid Step 110, by using the aforesaid equation (1) inversely. Further, the process goes forward to Step 115, where judgment is made whether the engine torque Ti thus calculated is less than the maximum torque Tmax or not. When the result of judgment is positive, the process goes forward to Step 116, a fuel consumption rate Fi at the relevant shift position is sought from a map of curves of secondary degree (referred to as "a fuel consumption rate map") showing the relationship between the engine rotational speed N, the engine torque T and the fuel consumption rate F, which is previously stored in the aforesaid ROM 66 as shown in FIG. 5, and read out.

On the other hand, when the result of judgment in the aforesaid Step 113 or 115 is negative, the relevant shift position cannot be shifted, and hence, the process goes forward to Step 117, where the fuel consumption rate is made to be infinity.

Upon completion of the process in Step 116 or 117, the process goes forward to Step 118, where the shift counter value C is counted down by one. Subsequently, the process goes forward to Step 119, where judgment is made whether the shift counter value C is zero or not. When the result of judgment is negative, it is judged that the calculation is not completed, and the process goes backward to the aforesaid Step 112 and the processes from Step 112 to Step 118 are repeated. On the other hand, when the result of judgment in Step 119 is positive, it is judged that the calculation is completed, and the process goes forward to Step 120, where the fuel consumption rates Fi at the respective shift positions (for example, $F_1$ to $F_5$) temporarily stored in the aforesaid RAM 68 are compared with each other. Subsequently, the process goes forward to Step 121, where the shift position where the best fuel consumption rate can be obtained (in the example shown in FIG. 5, the fifth speed corresponding to the fuel consumption rate $F_5$) is fed to the aforesaid digital indicator 56 as the shift position of the best fuel consumption rate, thus completing this program.

The shift position of the best fuel consumption rate is indicated in the digital indicator 56 as described above, whereby the driver can easily learn the shift position of the best fuel consumption rate, so that the shift position where the best fuel consumption rate can be obtained to perform the driving of the excellent fuel consumption rate.

In the present embodiment, the digital indicator 56 is adapted to indicate zero when the throttle valve 20 is closed, the clutch is in operation or the vehicle is stopped, whereby an abnormal value, an unnecessary value or the like is not indicated, so that the highly reliable information can be given to the driver. Needless to say, due attention paid by the driver makes it possible to indicate even in the above-described case.

Furthermore, in the present invention, the digital indicator 56 is adapted to directly indicate the optimum shift position where the best fuel consumption rate is obtainable, so that the driver of the vehicle can easily and quickly learn the optimum shift position. In addition, the shift position indicating means should not necessarily be limited to the digital indicator, but, needless to say, a shifting direction (shift-up or shift-down) to the optimum shifting direction where the best fuel consumption rate is obtainable may be indicated by an arrow mark or the like. In that case, the shift position indicating means may be provided inexpensively.

Further, in the present embodiment, the present invention is applied to the motor vehicle provided with the electronic controlled fuel injection type engine, the engine load sensor is substituted by the air flow meter for detecting the intake air flowrate and the crank angle sensor for detecting the engine rotational speed. However, the scope of application of the present invention should not necessarily be limited to this, but an engine load sensor may be separately provided or an engine load is detected by another method, so that the present invention can be likewise applied to vehicles each provided with an ordinary internal combustion engine.

It should be apparent to those skilled in the art that the above-described embodiments are merely representative, which represent the applications of the principles of the present invention. Numerous and varied other arrangements can be readily devised by those skilled in the art without departing from the spirit and the scope of the invention.

What is claimed is:

1. The optimum shift position indicating device of a vehicle, comprising:
    a vehicle speed sensor for detecting a running speed of the vehicle;
    an engine rotation sensor for detecting a rotational speed of an engine;
    an engine load sensor for detecting an engine load;
    an operational circuit in which a driving power at present is calculated from an engine torque obtainable from the engine rotational speed and the engine load, subsequently, required engine torques at respective shift positions are calculated form the driving power, further, fuel consumption rates at the respective shift positions are calculated from the required engine torques at the respective shift positions and the engine rotational speeds obtainable from said detected vehicle running speed, and information on the optimum shift position where the best fuel consumption rate is obtainable is outputted; and
    shift position indicating means for indicating an output from said operational circuit.

2. The optimum shift position indicating device of a vehicle as set forth in claim 1, wherein said engine load sensor is substituted by an air flow meter for detecting an intake air flowrate and said engine rotation sensor for detecting the engine rotational speed, whereby an engine load is obtained from a ratio Q/N between the air flowrate Q and the engine rotational speed N.

3. The optimum shift position indicating device of a vehicle as set forth in claim 1, wherein said engine torque is sought from an engine torque search map of curves of secondary degree showing the relationship between the engine rotational speed, the engine load and the engine torque.

4. The optimum shift position indicating device of a vehicle as set forth in claim 1, wherein said driving power is calculated from the engine torque Ta and the engine rotational speed N, through the following equation:

Driving power $= Ta \times N/716.2$.

5. The optimum shift position indicating device of a vehicle as set forth in claim 1, wherein said engine rotational speeds at the respective shift positions are calculated from the vehicle speed at present and the ratios between the engine rotational speeds and the vehicle speeds at the respective shift positions.

6. The optimum shift position indicating device of a vehicle as set forth in claim 1, wherein said required engine torques Ti at the respective shift positions are calculated from the engine rotational speeds Ni at the respective shift position and said driving power, through the relationship of the following equation:

Driving power $= Ti \times Ni/716.2$.

7. The optimum shift position indicating device of a vehicle as set forth in claim 1, wherein said fuel consumption rates at the respective shift positions are sought from a fuel consumption rate map of curves of secondary degree showing the relationship between the engine rotational speed, the engine torque and the fuel consumption rate.

8. The optimum shift position indicating device of a vehicle as set forth in claim 1 or 7, wherein the fuel consumption rate at a shift position, which cannot be selected because the engine rotational speed exceeds the allowable maximum rotational speed or the engine torque becomes more than the maximum engine torque, is made to be infinity.

9. The optimum shift position indicating device of a vehicle as set forth in claim 1, wherein said information on the optimum shift position comprises the optimum shift position itself where the best fuel consumption rate is obtainable and said shift position indicating means comprises a digital indicator for indicating said optimum shift position.

10. The optimum shaft position indicating device of a vehicle as set forth in claim 1, wherein said information on the optimum shift position comprises the optimum shift position itself where the best fuel consumption rate is obtainable and said shift position indicating means comprises a digital indicator for indicating said optimum shift position, said digital indicator indicating zero when a throttle valve is closed, a clutch is in operation or the vehicle is stopped.

11. The optimum shift position indicating device of a vehicle as set forth in claim 1, wherein said information on the optimum shaft position comprises a shift direction to the optimum shift position where the best fuel consumption rate is obtainable and said shift position indicating means comprises an indicator for indicating said shifting direction.

* * * * *